Nov. 18, 1947.    R. J. MILLER    2,430,989
MECHANISM FOR CONTROLLING WELDING CURRENT
Filed Nov. 8, 1944    2 Sheets-Sheet 1
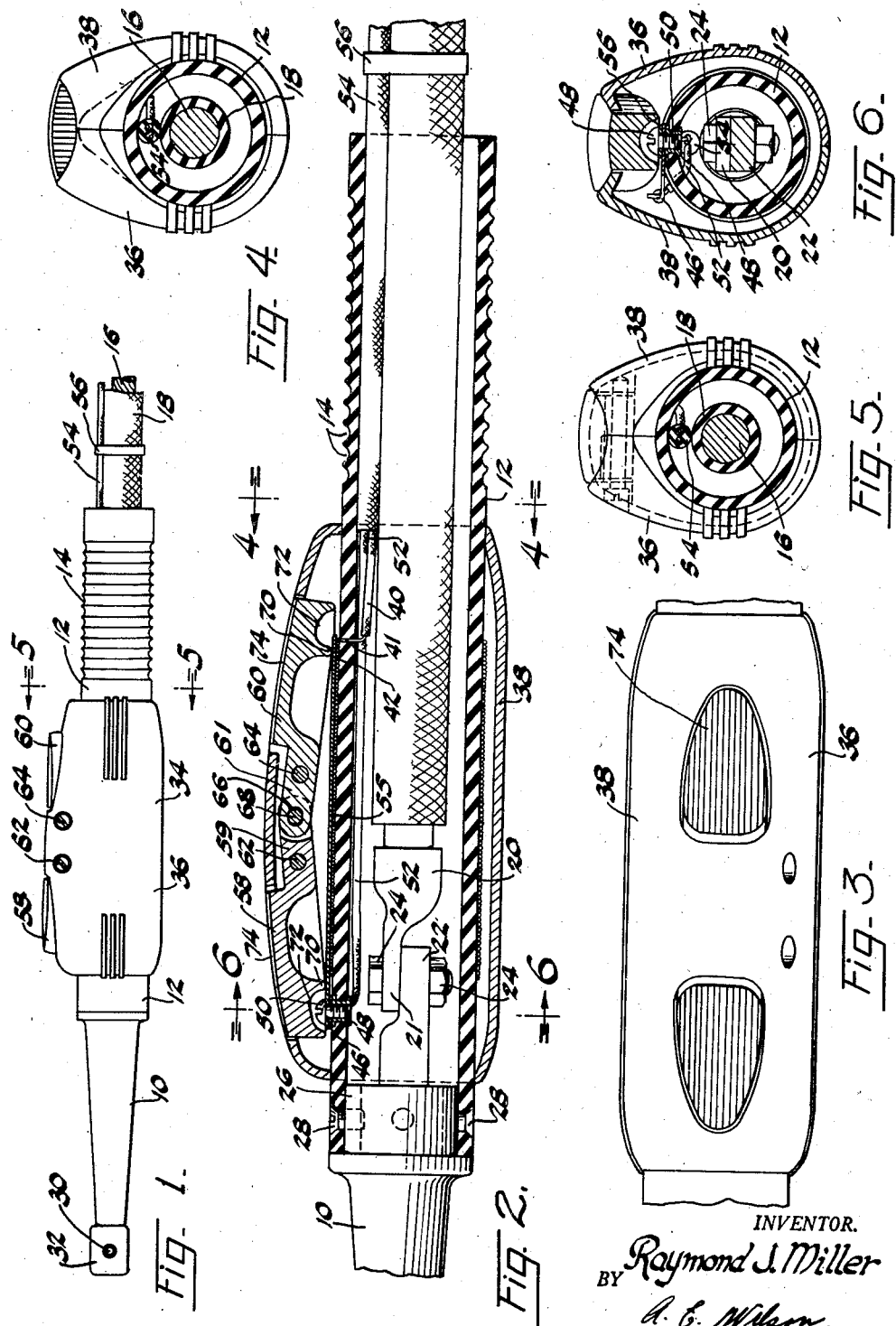
INVENTOR.
BY Raymond J. Miller
ATTORNEY.

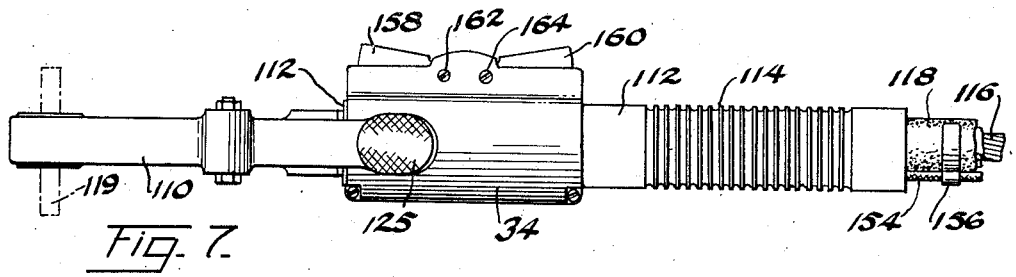
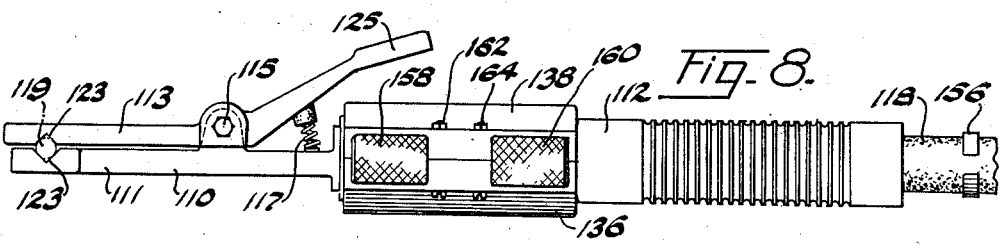
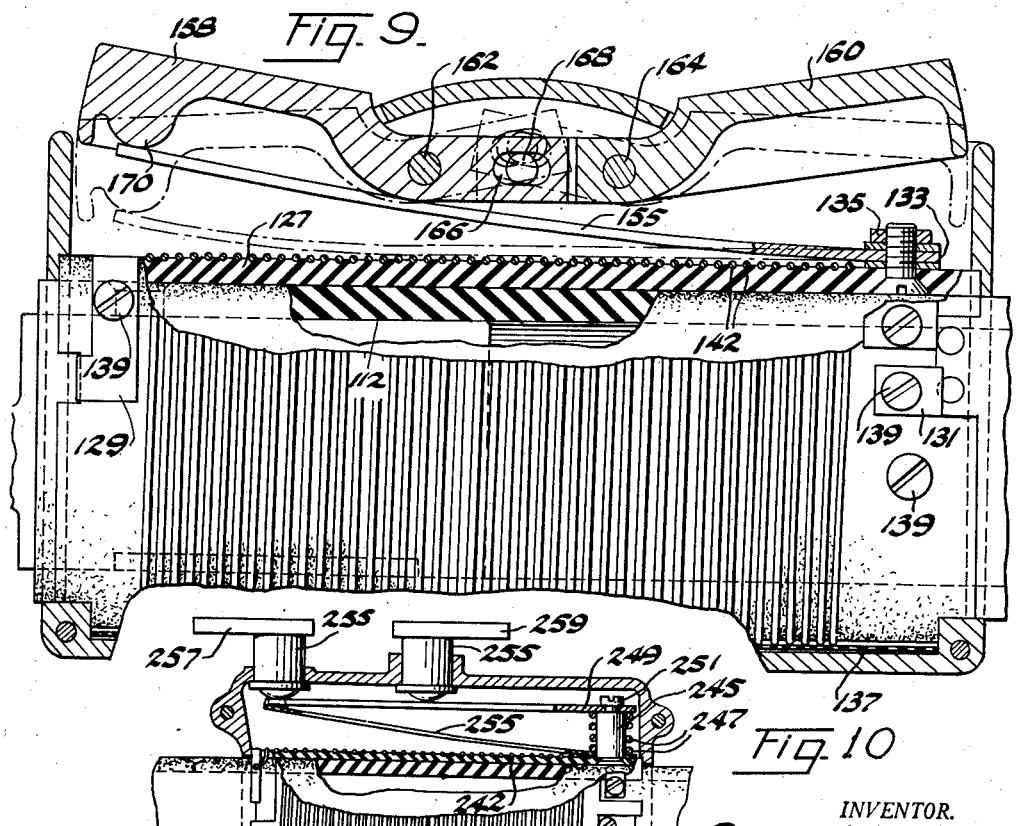

Patented Nov. 18, 1947

2,430,989

UNITED STATES PATENT OFFICE 2,430,989

MECHANISM FOR CONTROLLING WELDING CURRENT

Raymond J. Miller, Detroit, Mich.

Application November 8, 1944, Serial No. 562,461

5 Claims. (Cl. 201—48)

1

This invention relates to the art of welding and more particularly to the control of the welding current of electric welding devices.

In electric welding machines a current is transmitted through an electrode clamped in a manually actuated holder to complete an electric circuit through the members being welded to heat the work and melt down the electrode to fuse with the members being welded to join them together.

It is necessary to vary the intensity of the welding current as the welding operation progresses to compensate for variations of the electrical resistance of the work being welded, irregularities in density, mass and other variables, as well as the variations of resistance of the electrode as it is melted down.

Heretofore it has been customary to vary the electric current transmitted through the electrode by actuating a control positioned on the welding generator control panel to vary the current output of the generator. In order to vary the current output, it was necessary for the welder to leave his work and go to the control panel positioned at some distance from the point of welding. This resulting in considerable loss of time, and a tendency for the welder to continue welding even though the current employed were not the most desirable.

I have found that the welding current output of a welding generator of the D. C. type can be changed by varying the field intensity of the exciter generator employed to control the current output of the welding generator to continuously provide welding current of the desired intensity. The welding current can thus be accurately and continuously varied to insure the correct intensity of current at all times by controlling the few amperes current employed to energize the exciter generator.

I have also discovered that current of the low intensity required to vary the energization of the exciter circuit or to vary the current from the exciter field can conveniently be controlled by a small rheostat positioned on the electrode holder to enable the welder to vary the intensity of the welding current while a welding operation is in progress without relinquishing his grip on the electrode holder. With the regulator for varying the intensity of the welding current positioned on the electrode holder, the welder can readily vary the welding heat to insure using the proper current at all times. More perfect welds are thus insured and increased production is attained because there is no necessity for the welder to leave

2 his work to vary the intensity of the welding current.

An object of this invention is therefore to provide a manually actuated rheostat for varying the current intensity of the exciter field of a welding generator to vary the intensity of welding current supplied.

Another object of the invention resides in the provision of a manually actuated grip having a rheostat thereon adapted to be removably mounted on an electrode holder in such a manner that the rheostat may be actuated to vary the intensity of the welding current while a welding operation is in progress.

A further object is to provide a manually controlled rheostat carried by an electrode holder and operably connected to the exciter field of a welding generator to vary the intensity of the welding current from the point of weld without necessitating a welder relinquishing his grip on the holder.

Another object is to provide a welding current control mechanism carried by an electrode holder wherein longitudinally spaced actuating members are provided to enable a welder to vary the intensity of the welding current from either of the longitudinally spaced points.

Yet a further object is to provide an electrode holder handle having a resistance element operably connected to vary the welding current supplied by a welding generator and wherein a casing clamped to the handle is provided with spaced control members to actuate a contactor engaging the resistance element.

Still another object of the invention resides in the provision of a light-weight streamlined casing clamped to an electrode holder handle to control a rheostat operably connected to vary the welding current supplied to an electrode holder carried by the handle.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings wherein similar reference characters refer to similar parts throughout the several views:

Fig. 1 is a side elevation of an electrode holder embodying this invention.

Fig. 2 is a longitudinal sectional view of the welding current control mechanism of the holder illustrated in Fig. 1.

Fig. 3 is an enlarged fragmentary plan view of a portion of the device illustrated in Fig. 1.

Fig. 4 is a sectional view taken substantially on the line 4—4 of Fig. 2, looking in the direction of the arrows.

Fig. 5 is a phantom view taken substantially on the line 5—5 of Fig. 1, looking in the direction of the arrows.

Fig. 6 is a sectional view taken substantially on the line 6—6 of Fig. 2, looking in the direction of the arrows.

Fig. 7 is a side elevation of a modified form of the invention.

Fig. 8 is a plan view of the embodiment of the invention illustrated in Fig. 7.

Fig. 9 is an enlarged fragmentary sectional view of the actuating mechanism of the embodiment illustrated in Figs. 7 and 8.

Fig. 10 is a fragmentary sectional view of a still further modified form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now more particularly to the embodiment of the invention illustrated in Figs. 1 to 6, the reference numeral 10 indicates an electrode holder adapted to be secured to an insulated electrode holder handle 12 having circumferentially extending grooves 14 to facilitate holding the device.

Electric current may be supplied to the electrode holder 10 through an electrode cable 16 having suitable insulation 18 thereon and extending through the electrode holder handle 12 as illustrated in Fig. 2. The electrode cable 16 is provided with a connector 20 having an extended apertured portion 21 to engage an apertured portion 22 of the electrode holder 10 to be secured thereto by means of a bolt 24.

The electrode holder 10 is provided with a cylindrical portion 26 adapted to slide into the forward end of the handle 12 to be secured thereto as by means of spaced screws 28. In view of the fact that a plurality of screws 28 are employed to secure the electrode holder 10 in the handle 12, the angular relation of an electrode receiving aperture 30 with reference to the handle 12 may be varied by assembling the unit with the screws 28 projecting through appropriate apertures in the handle 12. An electrode clamping member 32 is provided on the holder 10 to permit clamping an electrode preferably in the form of a rod in the aperture 30 to project laterally therefrom as is customary in this art.

A welding current control mechanism 34 may be carried by the electrode holder handle 12. The current control mechanism 34 is housed within spaced shell numbers 36 and 38 adapted to be clamped to the handle 12. A rheostat positioned within the casing members 36 and 38 may be operably connected to vary the intensity of the exciter field controlling the source of welding current, such for example as a main generator to vary the intensity of the welding current transmitted through the electrode 16 to the electrode holder 10.

A wire 40 connected for example with the exciter field of the main generator may project through an aperture 41 in the holder handle 12 and be wrapped about the handle 12 to form a resistance element 42. The other end of the resistance coil 42 may be connected to a terminal 46 interposed between a bushing 48 secured in the handle 12 and a screw 50 threaded into the bushing. The terminal 46 may be connected to a wire 52 cooperating with the wire 40 to complete an electrical circuit through the exciter field of the exciter generator employed to vary the output of the welding generator. The wires 40 and 52 may be positioned in suitable insulation 54 and extend along the electrode cable 16 and be clamped thereto by means of suitable clamps 56.

A contactor member 55 preferably in the form of a spring having one end secured between the head of the screw 50 and the terminal 46 may be provided to successively engage spaced convolutions of the resistance coil 42 as the contactor 55 is actuated toward the fully engaged position with the resistance coil 42 as illustrated in Fig. 2 and to form an electrical connection with the terminal 46. The terminal 46 is preferably of proper thickness to act as a spacer to position the lower surface of the contactor 55 in alignment with the upper surface of the resistance coil 42.

Manually operable means may be provided to actuate the contactor 55. One desirable form of actuating means comprises spaced thumb controls 58 and 60 journalled on screws 62 and 64 employed to hold the sections 36 and 38 of the housing together. The thumb controls 58 and 60 are symmetrical to facilitate manufacture, and have cooperating motion transmitting portions 59 and 61 having elongated aligned apertures 66 to receive an actuating pin 68 to form a toggle connection to transmit movement of one of the thumb control members 58 and 60 to the other.

The thumb control members 58 and 60 are provided with downwardly extended actuating portions 70 adapted for example to engage the right hand extremity of the resistance coil contactor member 55 as viewed in Fig. 2 to move downwardly to progressively engage successive convolutions of the resistance coil 42. The thumb control members 58 and 60 are each provided with a cut-out portion 72 adapted to receive the head of the screw 50 when the member 58 is moved to the fully actuated position illustrated at the left hand portion of Fig. 2. The upper surface of the thumb actuated control members 58 and 60 is knurled as illustrated at 74 to prevent the thumb of the welder from slipping during operation of the device.

The operation of this embodiment of the invention is as follows. A welding electrode is positioned in the aperture 30 of the holder 10, and the member 32 is actuated to clamp the electrode in the holder. Welding current is supplied to the electrode through the electrode cable 16 from a suitable source of welding current and passes through the electrode holder 10 and electrode to complete a welding circuit formed by a ground cable extending from the source of welding current to the members being welded.

When current of high intensity is desired as for example to initiate the arc, either of the thumb control members 58 or 60 may be depressed toward the fully actuated position illustrated in Fig. 2 to virtually short circuit the resistance element 42 to transmit virtually the entire available current to the exciter field controlling the current output of the welding generator. The high current transmitted to the excitor field increases the energization of the main generator to supply welding current of high intensity to the electrode holder 10. After the arc has been struck, the thumb controls 58 and 60 may be actuated in the releasing direction to interpose a desired proportion of the resistance element 42 in the circuit through the wires 48 and 52 controlling the excitor field of the welding generator. The excitation of the main generator is thereby reduced to decrease the intensity of the welding current supplied to the electrode holder.

Whenever decreased welding current is required because of variations of the electrical resistance of the material being welded, or for other reasons, the thumb control 58 or 60 may be still further released to permit the spring contactor 55 to move upwardly to interpose a greater proportion of the resistance element 42 in the circuit thereby reducing the current supplied to the excitor field to decrease the energization of the main generator and reduce the welding current supplied.

If increased welding current is required, either of the controls 58 or 60 may be depressed to shift the point of engagement of the contactor 55 along the resistance coil 42 toward the right as viewed in Fig. 2. Movement of the point of engagement of the contactor member 55 toward the right hand end of the resistance element 55 progressively short circuits an increasing proportion of the resistance element 42 to progressively increase the current flowing through the excitor field controlling the main generator. As the excitation of the excitor circuit is progressively increased, the welding current supplied by the main generator and transmitted through the electrode holder 10 is progressively and correspondingly increased.

It will thus be apparent that the welder has continuous and positive control over the welding current, and may vary it through wide limits as desired to obtain the most desirable current intensity for the particular welding operation being performed at that particular moment.

As the electrode is burned down and its resistance therefore decreases, the thumb control 58 or 60 may be released to progressively increase the proportion of the resistance element 42 interposed in the circuit controlling the excitor field thereby reducing the degree of excitation of the excitor circuit to decrease the welding current supplied and thereby prevent the formation of a crater in the weld when it becomes necessary to replace the electrode and the welding operation is stopped.

It will be apparent that if the welder loses his grip on the electrode holder or drops it, the spring contactor 55 moves the control members 58 and 60 upwardly thereby introducing the full resistance of the resistance coil 42 in the circuit controlling the excitor field to reduce the welding current transmitted through the electrode holder to a minimum value.

In view of the fact that both of the control members 58 and 60 are effective to actuate the contactor member 55, the welder may actuate whichever of the controls is more convenient for him to engage. Great flexibility in the operation of the device is therefore insured.

The embodiment of the invention illustrated in Figs. 7 to 9 is similar in many respects to that illustrated in Figs. 1 to 6. Corresponding parts have therefore been given corresponding reference numerals with the addition of 100.

It will be noted that the electrode holder 110 is formed of two jaws 111 and 113 pivoted together at 115, and yieldingly urged in the closing position by means of a spring 117 to yieldingly engage an electrode 119 between contoured portions 123 of the jaws 111 and 113 respectively. A lever 125 may be provided to actuate the jaw 113 to permit positioning an electrode 119 in the jaws and to remove it when the electrode has been burned down to a predetermined point.

The resistance coil 142 is wrapped upon an insulated liner 127 adapted to slide over the electrode holder handle 112 to be secured thereto in any suitable manner as by stop members 129 and 131. The resistance element contactor member 155 may be secured to the insulated liner 127 by means of a stud 133 extending through the liner 127 to engage a nut 135. A suitable insulation such for example as a sheet 137 of insulating paper may be interposed between the resistance element 142 and the inner surface of the casing members 136 and 138 to insulate the resistance element from the casing.

Welding current control members of the type illustrated in this embodiment of the invention may be made to fit any desired size or shape of electrode holder handle, and may be applied thereto by means of screws 139 to adapt the invention to electrode holders of various sizes so that the invention can be employed with electrode holder handles already in use.

The embodiment illustrated in Fig. 10 is similar in many respects to that illustrated in Figs. 7 to 9. Corresponding parts have therefore been given corresponding reference numerals with the addition of 200.

It will be noted that the resistance element contactor member 255 is mounted on a stud 245 and is yieldingly urged toward the engaging position with the resistance element 242 by means of a spring 247 engaging in actuating member 249 mounted on the stud 245 by means of a screw 251. The actuating member 249 may be engaged by front and rear thumb controls 253 and 255 having forwardly and rearwardly extended thumb engaging portions 257 and 259 respectively to permit the welder to vary the position of the unit in his hand to compensate for individual preferences in the manner of holding the device.

The resistance element employed may be of any desired form. For example it may be formed of an insulated wire 42 as illustrated in the embodiment of Figs. 1 to 6 wherein successive convolutions of the resistance element contact each other, the insulation being formed on the wire in any desired manner as by the use of an oxide coating thereon. It will be apparent that the insulation material should be removed from the upper portion of the resistance element at the point of engagement of the contactor member to permit establishing good electrical connection between the contactor and successive convolutions of the resistance element.

If desired the resistance element may be formed of un-insulated wire as illustrated in the embodiment of Figs. 7 to 10 inclusive, wherein the resistance wire is wrapped about the core or insulating member in such a manner that successive convolutions of the wire do not engage each other.

The welding current control mechanisms illustrated herein may if desired be connected in the field of the main generator to vary the welding current supplied as illustrated in the wiring diagrams embodied in my copending application S. N. 562,462, filed November 8, 1944. The rheostat may also control a motor connected in the circuit to vary the potential of the main generator. The rheostat may be employed to control a reversible motor for raising or lowering the core of a transformer or to advance and retard the brushes of the generator, or to control the air gap to vary the welding current supplied.

Where an A. C. generator is employed as the source of welding current, it is preferable to use a contactor rather than the rheostat disclosed herein to control relay switches to cut in or cut out different portions of the transformer. The welding current supplied may also be varied by actuating an ignitron tube control.

I claim:

1. A welding electrode holder comprising a handle, a casing clamped to the handle, oppositely disposed longitudinally spaced levers pivotally mounted in the casing, connecting means between adjacently disposed ends of the levers whereby movement of each lever is transmitted to induce similar movement of the other lever, a control member positioned within the casing, and connecting means between the control member and one of said levers.

2. A handle for an electric welding device comprising a member adapted to receive an electrode holder, a casing clamped to said member, longitudinally spaced manually operable levers movably mounted in the casing, and a control member positioned to be actuated by either of said longitudinally spaced levers.

3. In a welding device, a handle adapted to receive an electrode holder, a casing clamped to the handle, a pair of independently operable longitudinally spaced levers mounted in the casing, and a movable control member positioned within the casing and adapted to be actuated by movement of either of said longitudinally spaced levers.

4. In a welding electrode holder, a handle adapted to receive an electrode holder, a casing clamped to the handle, longitudinally spaced levers mounted in the casing, a rheostat between the handle and the casing, and a contactor positioned to engage the rheostat and be activated by either of said levers.

5. A welding electrode holder handle comprising a handle adapted to receive an electrode holder, a rheostat associated with the handle, a two part casing clamped to the handle to overlie the rheostat, longitudinally spaced levers pivoted in the casing, connecting means between said levers to induce them to move in unison, and a contactor actuated by movement of said levers to engage the rheostat.

RAYMOND J. MILLER.

REFERENCES CITED

The following references are of record in the file of this patent:

UNITED STATES PATENTS

| Number | Name | Date |
| --- | --- | --- |
| 1,660,161 | Hansen | Feb. 21, 1928 |
| 1,683,059 | VanDeventer | Sept. 4, 1928 |
| 1,187,404 | Wilson | June 13, 1916 |
| 1,664,022 | Churchward | Mar. 27, 1928 |
| 1,240,901 | Symons | Sept. 25, 1917 |
| 1,371,192 | Bentley | Mar. 8, 1921 |
| 1,589,977 | Lucas | June 22, 1926 |
| 1,729,059 | Bicsey | Sept. 24, 1929 |
| 1,754,353 | Endebak | Apr. 15, 1930 |